United States Patent
Yang et al.

(10) Patent No.: US 11,018,590 B2
(45) Date of Patent: May 25, 2021

(54) CONTROL CIRCUIT FOR A FLYBACK CONVERTER

(71) Applicant: Silergy Semiconductor Technology (Hangzhou) LTD, Hangzhou (CN)

(72) Inventors: Xiangdong Yang, Hangzhou (CN); Xiaoru Xu, Hangzhou (CN); Yongjiang Bai, Hangzhou (CN); Zhiliang Hu, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/567,051

(22) Filed: Sep. 11, 2019

(65) Prior Publication Data
US 2020/0091826 A1 Mar. 19, 2020

(30) Foreign Application Priority Data

Sep. 18, 2018 (CN) .......................... 201811086983.X

(51) Int. Cl.
*H02M 3/335* (2006.01)

(52) U.S. Cl.
CPC ... *H02M 3/33523* (2013.01); *H02M 3/33515* (2013.01); *H02M 3/33592* (2013.01)

(58) Field of Classification Search
None
See application file for complete search history.

(56) References Cited

U.S. PATENT DOCUMENTS

| | | | |
|---|---|---|---|
| 5,528,481 A | 6/1996 | Caldeira et al. | |
| 6,058,026 A * | 5/2000 | Rozman | H02M 3/33561 363/16 |
| 8,310,846 B2 | 11/2012 | Piazzesi | |
| 8,917,068 B2 | 12/2014 | Chen et al. | |
| 9,331,588 B2 | 5/2016 | Chen | |
| 9,762,113 B2 | 9/2017 | Chen et al. | |
| 2015/0078041 A1 | 3/2015 | Huang | |
| 2015/0311810 A1 | 10/2015 | Chen et al. | |
| 2017/0047853 A1 | 2/2017 | Chen et al. | |
| 2018/0301975 A1* | 10/2018 | Lin | H02M 1/088 |
| 2019/0149052 A1* | 5/2019 | Gong | G01R 19/16547 363/21.07 |

FOREIGN PATENT DOCUMENTS

| | | |
|---|---|---|
| CN | 101572490 A | 11/2009 |
| CN | 106712472 A | 5/2017 |
| CN | 107017779 A | 8/2017 |
| CN | 107733235 A | 2/2018 |
| CN | 108809107 A | 11/2018 |
| DE | 102017126696 A1 * | 5/2019 ........ H02M 3/33523 |

* cited by examiner

*Primary Examiner* — Jeffrey A Gblende
(74) *Attorney, Agent, or Firm* — Michael C. Stephens, Jr.

(57) ABSTRACT

A control circuit for a flyback converter is configured to adjust a conduction time of an auxiliary switch of the flyback converter in accordance with a drain-source voltage of a main switch of the flyback converter when the main switch is turned on, in order to achieve zero-voltage switching of the main switch. The flyback converter can include: a main power stage having the main switch to control energy storage and transmission of a transformer; and a clamp circuit having an auxiliary switch to provide a release path for releasing energy of leakage inductance of the transformer.

19 Claims, 14 Drawing Sheets

CONTROL CIRCUIT FOR A FLYBACK CONVERTER

RELATED APPLICATIONS

This application claims the benefit of Chinese Patent Application No. 201811086983.X, filed on Sep. 18, 2018, which is incorporated herein by reference in its entirety.

FIELD OF THE INVENTION

The present invention generally relates to the field of power electronics, and more particularly to flyback converters, and associated control circuits and methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Figure 1:
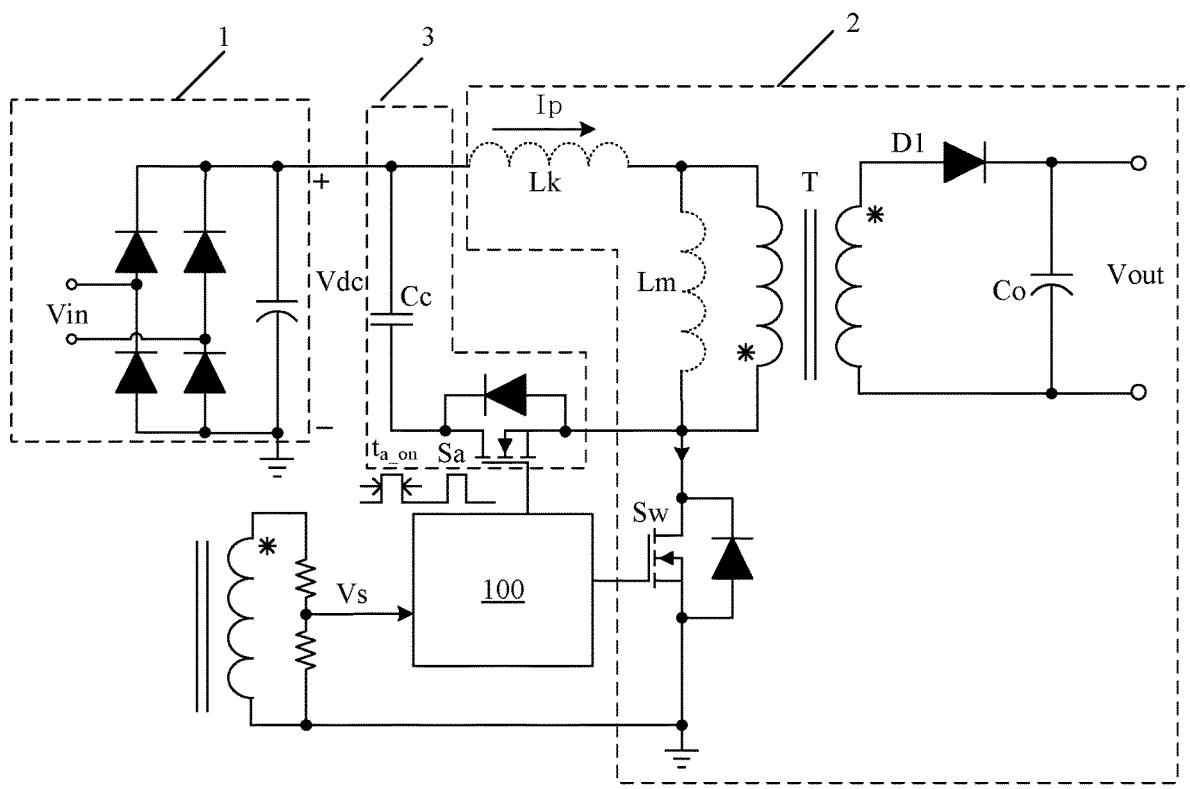
FIG. 1 is a schematic circuit diagram of a first example flyback converter, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A flyback converter is a power converter that stores energy in a transformer when a switch is turned on, and delivers energy stored in the transformer to the load when the switch is turned off. The transformer is the main component for storing energy and transferring energy in the flyback converter. When the switch is turned off, a spike voltage may be generated due to the leakage inductance of the primary winding of the transformer. In addition, when the switch operates in a hard switching mode, the waveforms of the voltage drop and the current rise may overlap during the turn-on process, which can cause a relatively large turn-on loss.

For an improved flyback converter, the spike voltage can be absorbed by a clamp control approach. The flyback converter can include a main switch and an auxiliary switch coupled to a primary winding of the transformer. The main switch and the auxiliary switch can alternately be turned on and off in a complementary manner. During the turn-off period of the main switch, the auxiliary switch may be in an on state, thereby forming an additional absorption circuit to absorb the energy stored in the leakage inductance of the primary winding, thereby suppressing the spike voltage. Since the main switch and the auxiliary switch can alternately be turned on and off in a complementary manner, the current flowing through the magnetizing inductance may continue to flow under the light load, such that the circulating energy is relatively large, and the peak of the current flowing through the diode coupled to the secondary winding of the transformer is relatively large, thereby resulting in a relatively large loss of the diode. Therefore, the energy consumption standard requirements may not be met due to relatively large losses under a light load with such a clamp control approach for the flyback converter.

In another example flyback converter, the main switch and the auxiliary switch may not be alternately turned on and off in a complementary manner, but rather the auxiliary switch may only be turned on for a fixed time before the main switch is turned on. Since the conduction time of the auxiliary switch is the fixed time, the main switch and the auxiliary switch may not realize zero-voltage-switching in a wide input voltage range, which may not be conducive to high frequency operation of the flyback converter.

Particular embodiments may further reduce losses of the auxiliary switch and the main switch, and also achieve high frequency operation of the flyback converter with clamp control. In certain embodiments, the switch is a transistor that operates in a switching mode to provide a current path, and can be a bipolar transistor or a field-effect transistor, for example. The first and second terminals of the switch may respectively be a high potential end and a low potential end on the current path, and the control terminal can receive a drive signal to control the on and off states of the switch.

In one embodiment, a control circuit for a flyback converter is configured to adjust a conduction time of an auxiliary switch of the flyback converter in accordance with a drain-source voltage of a main switch of the flyback converter when the main switch is turned on, in order to achieve zero-voltage switching of the main switch. The flyback converter can include: a main power stage having the main switch to control energy storage and transmission of a transformer; and a clamp circuit having an auxiliary switch to provide a release path for releasing energy of leakage inductance of the transformer.

Referring now to FIG. 1, shown is a schematic circuit diagram of a first example flyback converter, in accordance with embodiments of the present invention. The flyback converter can include bridge rectifier 1, main power stage 2, clamp circuit 3, and control circuit 100. Bridge rectifier 1 can receive and rectify external input voltage signal Vin to obtain direct current (DC) input voltage Vdc. Main power stage 2 can include transformer T, main switch Sw coupled in series with a primary winding of transformer T, diode D1 coupled in series with a secondary winding of transformer T, and output capacitor Co. In this example, a dotted terminal of the primary winding of transformer T can be coupled to a first terminal of main switch Sw, and a non-dotted terminal of the primary winding of transformer T may be coupled to bridge rectifier 1 to obtain the DC input voltage. A second terminal of main switch Sw can be grounded. A dotted terminal of the secondary winding of transformer T may be coupled to an anode of diode D1, and output capacitor Co can be coupled between a cathode of diode D1 and a non-dotted terminal of the secondary winding of transformer T. DC output voltage Vout may be provided across output capacitor Co.

Clamp circuit 3 coupled in parallel with the primary winding of transformer T can include auxiliary switch Sa and clamp capacitor Cc coupled in series between two terminals of the primary winding of transformer T. In this particular example, the primary winding of transformer T may be equivalent to the series-connected magnetizing inductance Lm and leakage inductance Lk, which are respectively shown by dotted lines. Control circuit 100 can be coupled to main switch Sw and auxiliary switch Sa, respectively, for controlling the on and off states of both. During the operation process, main switch Sw may alternately be turned on and off.

During the turn-on period of main switch Sw, primary current Ip can flow through the primary winding of transformer T. Then, primary current Ip may gradually rise with the conduction time of main switch Sw. During this period, transformer T can store energy. Diode D1 coupled to the secondary winding of transformer T may be turned off due to the reverse bias. During the turn-off period of main switch Sw, primary current Ip of the primary winding of transformer T can be reduced to zero, and diode D1 coupled to the secondary winding may be turned on due to the forward bias. Thus, transformer T can release energy to supply power to output capacitor Co and the load.

During the turn-off period of main switch Sw, auxiliary switch Sa can be turned on for at least a period of time, such that clamp circuit 3 may begin to operate. The energy stored in leakage inductance Lk of transformer T can be released into clamp capacitor Cc through the body diode of auxiliary switch Sa, thereby suppressing the parasitic oscillation generated by leakage inductance Lk, that is, suppressing the spike voltage to improve electromotive interference (EMI) characteristics. For example, the conduction time of auxiliary switch Sa in the flyback converter may not be fixed. In this particular example, control circuit 100 can receive voltage Vs at common node A of resistors R1 and R2, which are coupled in series at two terminals of an auxiliary winding. Voltage Vs can characterize the drain-source voltage of main switch Sw. Also, control circuit 100 can convert voltage Vs to generate a sampling voltage that characterizes the drain-source voltage of main switch Sw.

Control circuit 100 can also generate control signals for controlling auxiliary switch Sa and main switch Sw according to the sampling voltage. In this way, the conduction time and turn-on moment of auxiliary switch Sa, as well as the turn-on moment of main switch Sw can be adjusted, such that main switch Sw can be turned on after the drain-source voltage decreases to zero. In this way, zero-voltage-switching and reducing turn-on losses of auxiliary switch Sa can both be achieved. An additional absorption circuit with clamp circuit 2 can also be formed, thereby suppressing the spike voltage. In addition, by controlling the conduction time of auxiliary switch Sa and main switch Sw, main switch Sw can realize zero-voltage-switching, and turn-on losses of auxiliary switch Sa can be reduced. This can improve the efficiency, and may facilitate integration of auxiliary switch Sa in the chip and the high frequency of the system.

In this particular example, control circuit 100 can compare the sampling voltage at the time when main switch Sw is turned on against a threshold voltage to generate a detection signal. The threshold voltage may be generated in accordance with the sampling voltage. For example, when the sampling voltage is greater than the threshold voltage, the detection signal can be active, and the control circuit may decrease the conduction time of auxiliary switch Sa. Also, when the sampling voltage is less than the threshold voltage, the detection signal may be inactive, and the control circuit may increase the conduction time of auxiliary switch Sa. The conduction time of auxiliary switch Sa can be adjusted according to the drain-source voltage of main switch Sw at the time when main switch Sw is turned on, thereby further improving the effect of suppressing the spike voltage. Those skilled in the art will recognize that other circuitry to obtain the drain-source voltage of the main switch at the time when the main switch is turned on can be applied herein to be compared against the threshold voltage.

Figure 2:
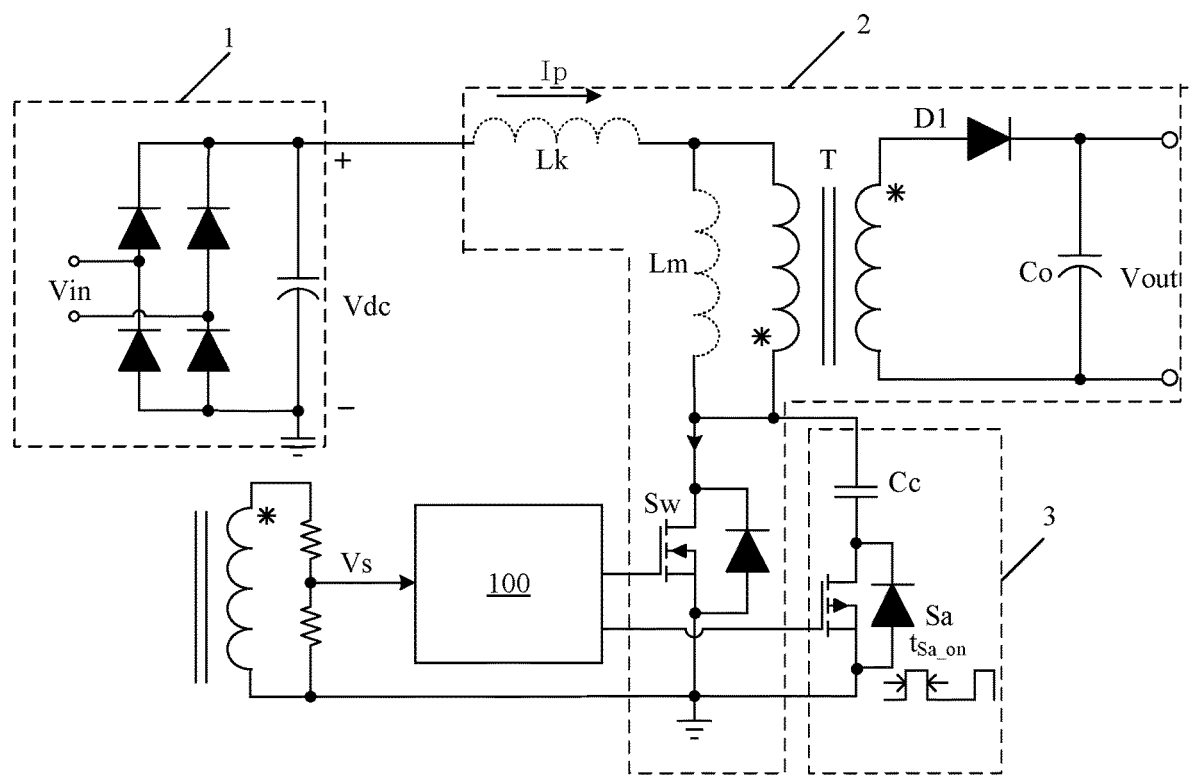
FIG. 2 is a schematic circuit diagram of a second example flyback converter, in accordance with embodiments of the present invention.

Referring now to FIG. 2, shown is a schematic circuit diagram of a second example flyback converter, in accordance with embodiments of the present invention. This particular example flyback converter can include bridge rectifier 1, main power stage 2, clamp circuit 3, and control circuit 100. Here, clamp circuit 3 coupled in series with the primary winding of transformer T can include auxiliary switch Sa and clamp capacitor Cc coupled in series between first and second terminals of main switch Sw. In this particular example, the primary winding of transformer T may be equivalent to the series-connected magnetizing inductance Lm and leakage inductance Lk, which are respectively shown by dotted lines.

During the operation process, main switch Sw can alternately be turned on and off. During the turn-on period of main switch Sw, primary current Ip may flow through the primary winding of transformer T. Then, primary current Ip may gradually rise with the conduction time of main switch Sw. During this period, transformer T can store energy. Diode D1 coupled to the secondary winding of transformer T may be turned off due to the reverse bias. During the turn-off period of main switch Sw, primary current Ip of the primary winding of transformer T can be reduced to zero, and diode D1 coupled to the secondary winding may be turned on due to the forward bias. Thus, transformer T can release energy to supply power to output capacitor Co and the load.

During the turn-off period of main switch Sw, auxiliary switch Sa may be turned on for at least a period of time before clamp circuit 3 starts to operate. The energy stored in leakage inductance Lk of the transformer can be released into clamp capacitor Cc through the body diode of auxiliary switch Sa, thereby suppressing the parasitic oscillation generated by leakage inductance Lk; that is, suppressing the spike voltage to improve the EMI characteristics.

Control circuit 100 can obtain voltage Vs by sampling the voltage across the auxiliary winding. Voltage Vs can characterize the drain-source voltage of main switch Sw. Also, control circuit 100 can generate a sampling voltage that represents the drain-source voltage of main switch Sw based on voltage Vs, and may generate control signals for auxiliary switch Sa and main switch Sw according to the sampling voltage, in order to adjust the conduction time and turn-on moment of auxiliary switch Sa and to adjust the turn-on moment of main switch Sw. In this way, main switch Sw can be turned on after the drain-source voltage decreases to zero, thereby achieve the zero-voltage-switching of main switch Sw and reducing the turn-on loss of auxiliary switch Sa.

Figure 3:
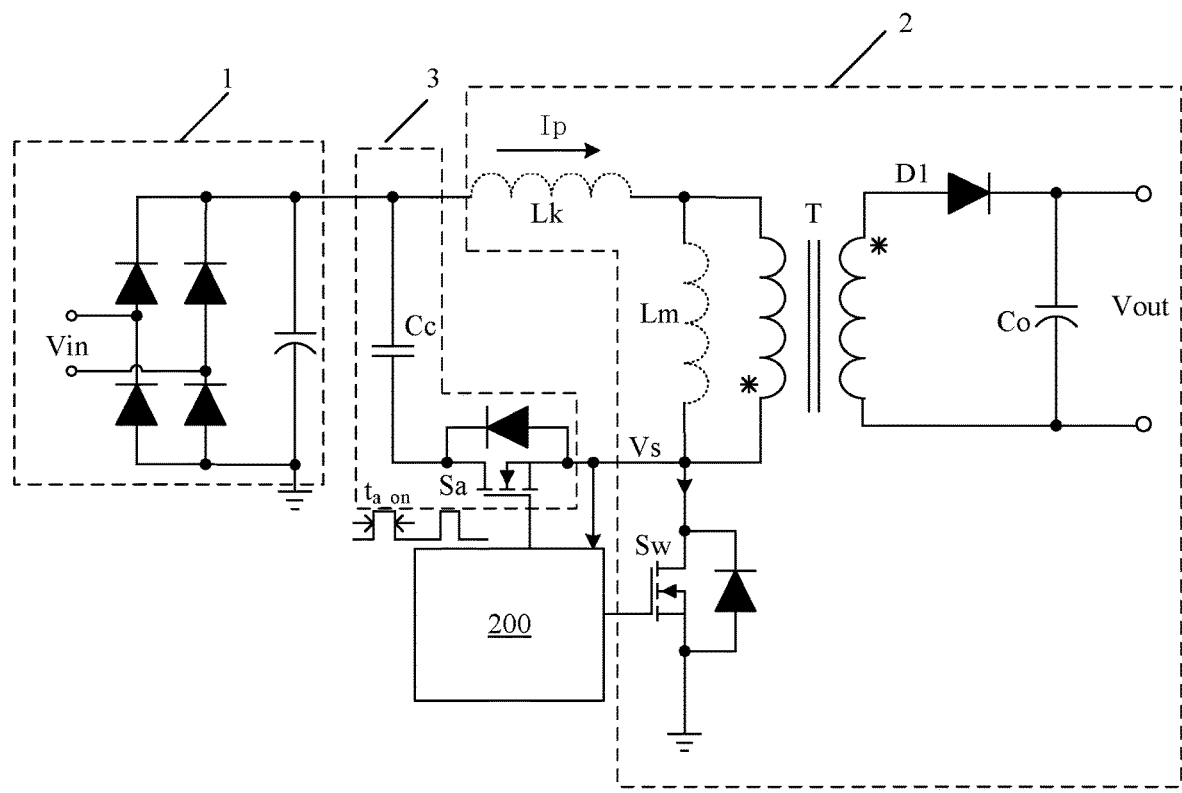
FIG. 3 is a schematic circuit diagram of a third example flyback converter, in accordance with embodiments of the present invention.

Referring now to FIG. 3, shown is a schematic circuit diagram of a third example flyback converter, in accordance with embodiments of the present invention. The flyback converter can include bridge rectifier 1, main power stage 2, clamp circuit 3, and control circuit 200. Bridge rectifier 1 can receive and rectify external input voltage signal Vin to obtain a DC input voltage. Clamp circuit 3 may be coupled in parallel with the primary winding of transformer T and can include auxiliary switch Sa and clamp capacitor Cc coupled in series between two terminals of the primary winding of transformer T. In this particular example, the primary winding of transformer T may be equivalent to the series-connected magnetizing inductance Lm and leakage inductance Lk, which are respectively shown by dotted lines. During the operation process, main switch Sw can alternately be turned on and off.

During the turn-off period of main switch Sw, auxiliary switch Sa may be turned on for at least a period of time before clamp circuit 3 starts to operate. The energy stored in leakage inductance Lk of the transformer can be released into clamp capacitor Cc through the body diode of auxiliary switch Sa, thereby suppressing the parasitic oscillation generated by leakage inductance Lk; that is, suppressing the spike voltage to improve the EMI characteristics.

In this particular example, control circuit 200 can directly sample the voltage at the drain of main switch Sw to generate voltage Vs, which characterizes the low voltage part of the drain-source voltage of main switch Sw. Also, control circuit 200 can generate a sampling voltage based on voltage Vs, and may generate control signals for auxiliary switch Sa and main switch Sw according to the sampling voltage. This can adjust the conduction time and turn-on moment of auxiliary switch Sa and adjust the turn-on moment of main switch Sw, such that main switch Sw can be turned on after the drain-source voltage decreases to zero, thereby achieving zero-voltage-switching of main switch Sw and reducing turn-on loses of auxiliary switch Sa.

In this particular example, control circuit 200 can compare the sampling voltage at the time when main switch Sw is turned on against a threshold voltage to generate a detection signal. In this example, the threshold voltage is a preset value (e.g., approaching zero). For example, when the sampling voltage is greater than the threshold voltage, the detection signal may be active, and control circuit 200 may reduce the conduction time of auxiliary switch Sa. Also, when the sampling voltage is less than the threshold voltage, the detection signal may be inactive, and control circuit 200 may increase the conduction time of auxiliary switch Sa. When the sampling voltage approaches the preset value, the switching loss of main switch Sw can be relatively small. Thus, the preset value can be set according to the particular application requirements, such that the switching loss of main switch Sw meets the power loss requirements. The conduction time of auxiliary switch Sa may be according to the drain-source voltage of main switch Sw, thereby further improving the effect of suppressing the spike voltage.

Figure 4:
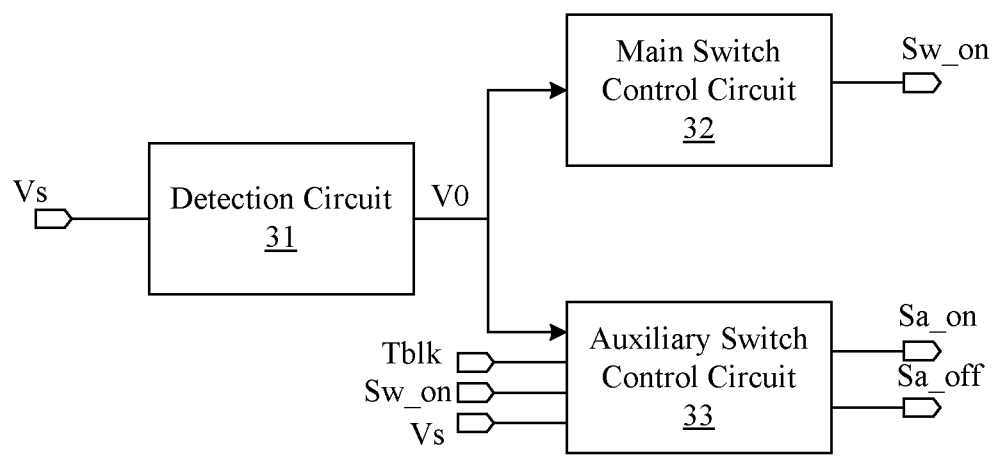
FIG. 4 is a schematic circuit diagram of an example control circuit, in accordance with embodiments of the present invention.

Referring now to FIG. 4, shown is a schematic block diagram of an example control circuit, in accordance with embodiments of the present invention. The control circuit can include detection circuit 31, main switch control circuit 32, and auxiliary switch control circuit 33. For example, detection circuit 31 can generate voltage Vs that characterizes the drain-source voltage of main switch Sw by sampling the voltage of the auxiliary winding. Voltage Vs can be converted to generate a sampling voltage. A threshold voltage may be generated according to the sampling voltage, and the sampling voltage can be compared against the threshold voltage to generate detection signal V0.

In another example, detection circuit 31 can directly sample the voltage at the drain of main switch Sw to generate voltage Vs that characterizes the low voltage part of the drain-source voltage of main switch Sw. Also, a sampling voltage can be generated according to voltage Vs. Detection signal V0 can be generated by comparing the sampling voltage against a threshold voltage, where the threshold voltage is a preset value. In this example, main switch control circuit 32 can generate turn-on signal Sw_on for controlling main switch Sw to be turned on when detection signal V0 is active. Based on different loop controls of the flyback converter, the control circuit can generate a turn-off signal to control main switch Sw to be turned off, e.g., according to a peak value of an inductor current or the constant on-time of main switch Sw.

Auxiliary switch control circuit 33 can receive detection signal V0, turn-on signal Sw_on, and frequency limit signal Tblk to generate turn-on signal Sa_on and turn-off signal Sa_off for controlling auxiliary switch Sa to be turned on and off, respectively. When detection signal V0 is inactive, auxiliary switch control circuit 33 may increase the conduction time of auxiliary switch Sa according to turn-on signal Sw_on. When detection signal V0 is active, auxiliary switch control circuit 33 may reduce the conduction time of auxiliary switch Sa according to turn-on signal Sw_on. A reverse direction magnetizing inductance current flowing through magnetizing inductance Lm can be changed by adjusting the conduction time of auxiliary switch Sa, thereby realizing zero-voltage switching of main switch Sw.

Auxiliary switch control circuit 33 can generate voltage Vs characterizing the drain-source voltage of main switch Sw by sampling the voltage across the auxiliary winding. Also, auxiliary switch control circuit 33 can detect a wave-peak of the drain-source voltage of main switch Sw according to voltage Vs to generate a wave-peak detection signal. Then, turn-on signal Sa_on may be generated according to the wave-peak detection signal and frequency limit signal Tblk, in order to control auxiliary switch Sa to be turned on at the wave-peak moment of the drain-source voltage of main switch Sw, thereby reducing turn-on losses of auxiliary switch Sa.

Figure 5:
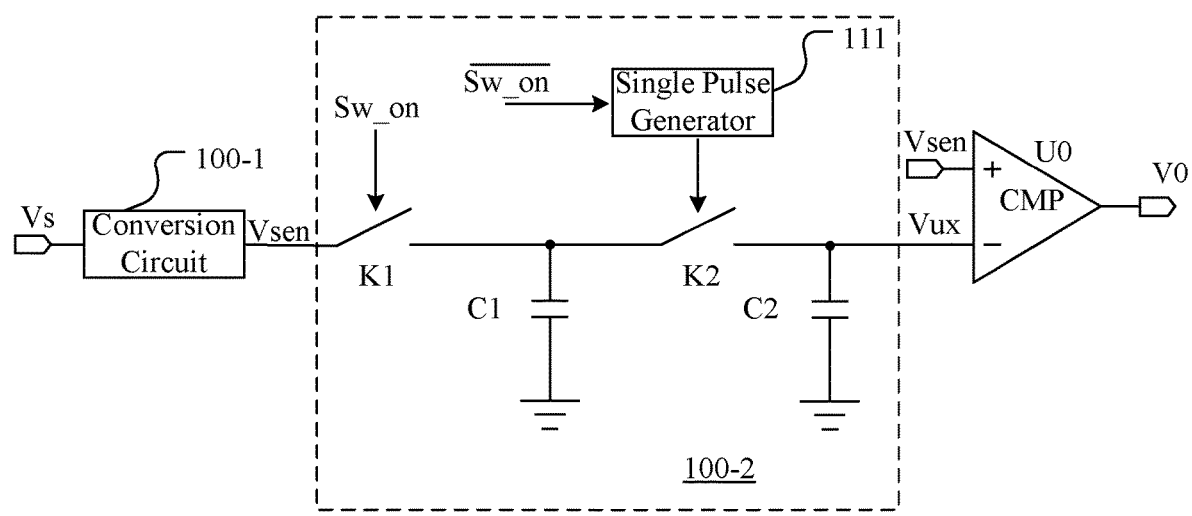
FIG. 5 is a schematic circuit diagram of an example detection circuit of the control circuit for the flyback converter, in accordance with embodiments of the present invention.

Referring now to FIG. 5, shown is a schematic block diagram of an example detection circuit of the control circuit, in accordance with embodiments of the present invention. In this example, the detection circuit can include conversion circuit 100-1, sample-and-hold circuit 100-2, and comparator U0. After diode D1 of the secondary side of the flyback converter is turned off, the voltage of the auxiliary winding can indirectly characterize the drain-source voltage of main switch Sw. Then, conversion circuit 100-1 can remain the positive voltage portion of voltage Vs sampled by the voltage of the auxiliary winding, and can make the negative voltage part of voltage Vs be zero, in order to obtain sampling voltage Vsen.

Sample-and-hold circuit 100-2 can hold sampling voltage Vsen during the on state of main switch Sw, and obtain threshold voltage Vux according to sampling voltage Vsen. In this particular example, sample-and-hold circuit 100-2 can include switches K1 and K2 coupled in series between the output terminal of conversion circuit 100-1 and one input terminal (e.g., an inverting input terminal) of comparator U0. The switching state of switch K1 may be controlled by turn-on signal Sw_on. Sample-and-hold circuit 100-2 can also include capacitors C1 and C2 and single pulse generator 111. A first terminal of capacitor C1 can connect to a common node of switches K1 and K2, and a second terminal of capacitor C1 may be grounded. A first terminal of capacitor C2 can connect to one input terminal (e.g., the inverting input terminal) of comparator U0, and a second terminal of capacitor C2 may be grounded. Single pulse generator 111 can generate a control signal for controlling the switching state of switch K2 based on the inverted signal of turn-on signal Sw_on. In each switching period, main switch Sw may be in the on state when turn-on signal Sw_on remains active.

During the current switching period, sample-and-hold circuit 100-2 can obtain sampling voltage Vsen stored in capacitor C1 when main switch Sw is turned on, and the voltage across capacitor C2 may be sampling voltage Vsen sampled in the last switching period. When main switch Sw is turned off, sampling voltage Vsen can be held at capacitor C2. Then, threshold voltage Vux during the current switching period can be obtained according to the voltage across capacitor C2. In another example, threshold voltage Vux during the current switching period may be equal to 0.9 times the voltage across capacitor C2 sampled by a resistor voltage divider network, thereby leaving a certain voltage margin, and ensuring that the detection circuit can adjust the main switch control circuit and the auxiliary switch control circuit in time.

Comparator U0 can compare sampling voltage Vsen against threshold voltage Vux when main switch Sw is turned on to generate detection signal V0. When sampling voltage Vsen is not less than threshold voltage Vux when main switch Sw is turned on, detection signal V0 can be active, and then the conduction time of auxiliary switch Sa can be reduced by the control circuit. When sampling voltage Vsen is less than threshold voltage Vux when main switch Sw is turned on, detection signal V0 may be inactive, and the conduction time of auxiliary switch Sa can be increased by the control circuit to achieve zero-voltage switching of main switch Sw.

Figure 6:
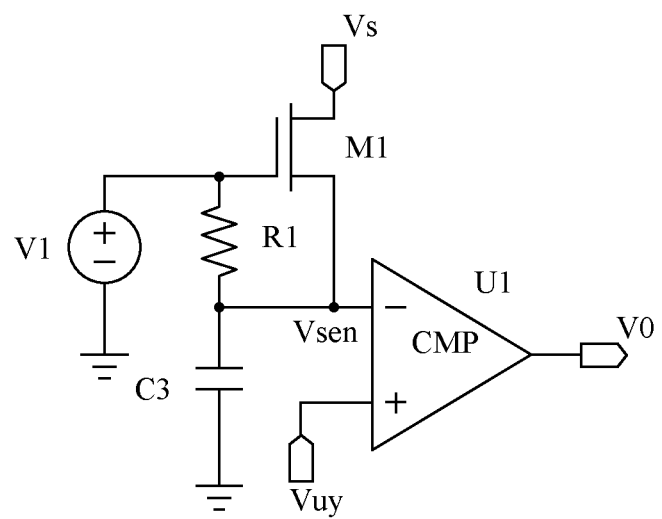
FIG. 6 is a schematic circuit diagram of another example detection circuit of the control circuit, in accordance with embodiments of the present invention.

Referring now to FIG. 6, shown is a schematic circuit diagram of another example detection circuit of the control circuit, in accordance with embodiments of the present invention. In this particular example, the detection circuit can include a conversion circuit to generate sampling voltage Vsen according to voltage Vs. For example voltage Vs can be generated by directly sampling the train voltage of main switch Sw. The conversion circuit can include transistor M1 and voltage source V1. For example, transistor M1 is a high-voltage transistor, and a first terminal of transistor M1 can connect to the drain of main switch Sw to sample the voltage at the drain of main switch Sw to generate voltage Vs characterizing the drain-source voltage of main switch Sw. A second terminal of transistor M1 may provide sampling voltage Vsen. A positive pole of voltage source V1 can connect to a control terminal of transistor M1, and a negative pole of voltage source V1 may be grounded. In this example, voltage source V1 can be set with a low voltage level. When voltage Vs is less than the difference between voltage source V1 and a gate threshold of transistor M1, transistor M1 can be turned on and sampling voltage Vsen can be approximately equal to voltage Vs. That is, the low voltage portion of the drain-source voltage of main switch Sw can be obtained.

The conversion circuit can also include resistor R1 and capacitor C3, coupled in series between the control terminal of transistor M1 and ground. Resistor R1 can provide a bleed path for the control terminal of transistor M1, to ensure stable operation of transistor M1. Capacitor C3 may be used for filtering, in order to obtain a stable sampling voltage Vsen. The detection circuit can also include comparator U1. An inverting input terminal of comparator U1 can connect to the second terminal of transistor M1, and a non-inverting input terminal can receive threshold voltage Vuy. In this example, threshold voltage Vuy is a preset value (e.g., approaching to zero). The inverting input terminal of comparator U1 can also connect to a common node of resistor R1 and capacitor C3.

In this example, comparator U1 can compare sampling voltage Vsen against threshold voltage Vuy to provide detection signal V0 at an output terminal of comparator U1. In this particular example, if sampling voltage Vsen is not less than threshold voltage Vuy when main switch Sw is turned on, detection signal V0 may be inactive, such that the conduction time of auxiliary switch Sa can be increased, thereby increasing the reverse direction magnetizing inductance current flowing through magnetizing inductance Lm. When sampling voltage Vsen is less than threshold voltage Vuy when main switch Sw is turned on, detection signal V0 can be active, such that the conduction time of auxiliary switch Sa is reduced, thereby decreasing the reverse direction magnetizing inductance current flowing through magnetizing inductance Lm. After several switching periods of adjustment, sampling voltage Vsen sampled when main switch Sw is turned on can be closer to threshold voltage Vuy, thereby achieving zero-voltage switching of main switch Sw.

Figure 7:
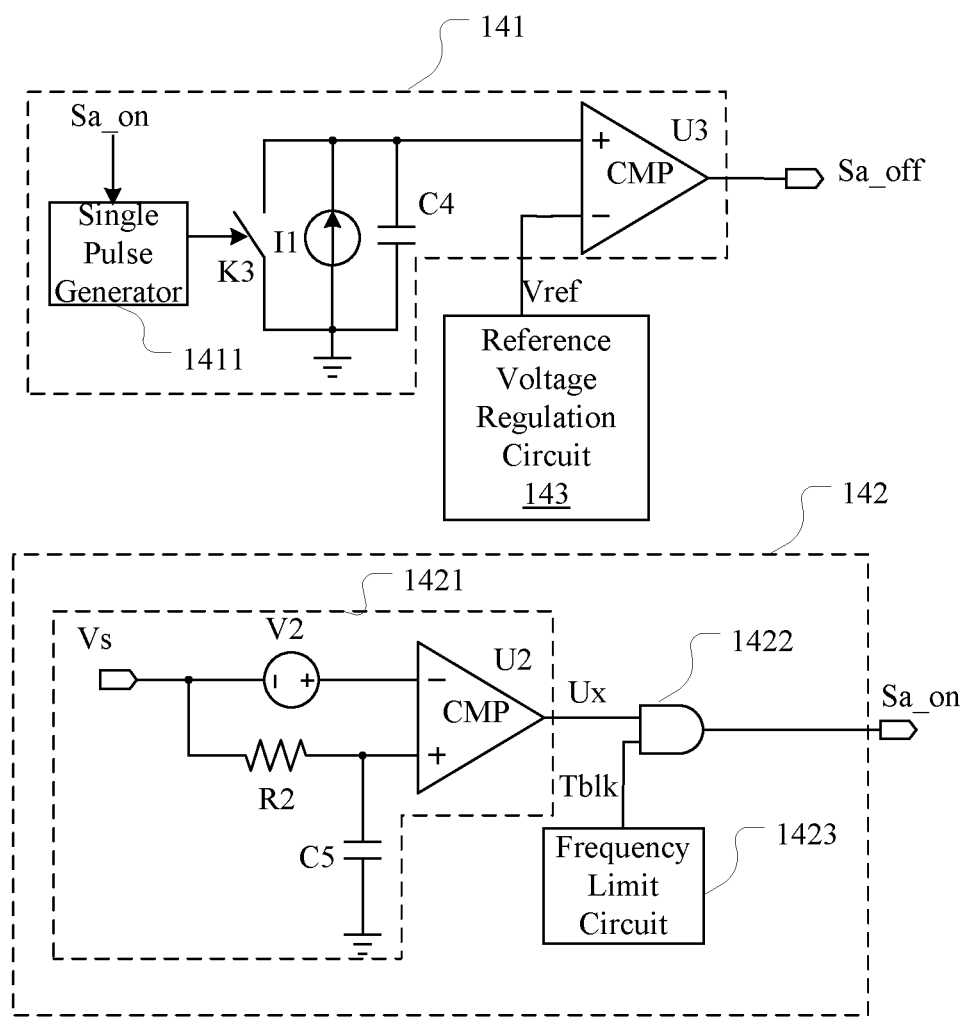
FIG. 7 is a schematic circuit diagram of an example auxiliary switch control circuit of the control circuit, in accordance with embodiments of the present invention.

Referring now to FIG. 7, shown is a schematic circuit diagram of an example auxiliary switch control circuit of the control circuit, in accordance with embodiments of the present invention. In this example, the auxiliary switch control circuit can control the switching state of auxiliary switch Sa. The auxiliary switch control circuit can include reset signal generating circuit 141, set signal generating circuit 142, and reference voltage regulation circuit 143. Set signal generating circuit 142 can generate turn-on signal Sa-on for controlling auxiliary switch Sa to be turned on based on wave-peak detection signal Ux and frequency limit signal Tblk. Set signal generating circuit 142 can include wave-peak detection circuit 1421 and frequency limit circuit 1423. In this example, wave-peak detection circuit 1421 can sample the voltage of the auxiliary winding to generate voltage Vs that characterizes the drain-source voltage of main switch Sw, and superimpose a bias voltage on voltage Vs to generate a biased sampling voltage. Also, wave-peak detection circuit 1421 can simultaneously delay first voltage Vs to generate a delayed sampling voltage, and generate wave-peak detection signal Ux according to the biased sampling voltage and the delayed sampling voltage. Frequency limit circuit 1423 can be used to obtain frequency limit signal Tblk.

For example, wave-peak detection circuit 1421 can include comparator U2 and voltage source V2. A positive pole of voltage source V2 can connect to an inverting input terminal of comparator U2, and a negative pole of voltage source V2 can receive voltage Vs. Wave-peak detection circuit 1421 can also include resistor R2 and capacitor C5. Resistor R2 and capacitor C5 may be coupled in series between the negative pole of voltage source V2 and ground, and the common node of resistor R2 and capacitor C5 can connect to a non-inverting input terminal of comparator U2. In this example, voltage source V2 can supply a bias voltage to be superimposed on voltage Vs, in order to obtain the biased sampling voltage. Also, resistor R2 and capacitor C5 can form an RC delay circuit for delaying voltage Vs by a predetermined time, in order to obtain the delayed sampling voltage. Comparator U2 can compare the biased sampling voltage against the delayed sampling voltage to provide wave-peak detection signal Ux at the output terminal of comparator U2. Further, set signal generating circuit 142 can also include AND-gate 1422 to generate turn-on signal Sa-on for controlling auxiliary switch Sa to be turned on according to wave-peak detection signal Ux and frequency limit signal Tblk.

In this particular example, reset signal generating circuit 141 can include comparator U3, current source IL charging capacitor C4, switch K3, and single pulse generator 1411. In this example, current source IL charging capacitor C4 and switch K3 can be coupled in parallel between a non-inverting input terminal of comparator U3 and ground, and an inverting input terminal of comparator U3 can receive reference voltage signal Vref. Single pulse generator 1411 can generate a control signal for controlling switch K3 based on turn-on signal Sa-on. When switch K3 is turned off, current source I1 can charge charging capacitor C4, such that a second voltage at the non-inverting input terminal of comparator U3 (e.g., the voltage across charging capacitor C4) may rise with a predetermined slope.

When switch K3 is turned on, charging capacitor C4 can be short-circuited, such that the second voltage becomes zero in a short time. Therefore, after auxiliary switch Sa is turned on, the voltage across charging capacitor C4 may be set to zero for a pulse time, and then current source I1 can charge charging capacitor C4 when switch K3 is turned off after the pulse time, such that the second voltage can rise until reaching reference voltage signal Vref. Then, comparator U3 can generate turn-off signal Sa-off for controlling auxiliary switch Sa to be turned off. In this example, turn-on signal Sa-on and turn-off signal Sa-off can respectively control the turn-on moment and turn-off time of auxiliary switch Sa in one switching period. The conduction time of auxiliary switch Sa may be the period between the continuous turn-on moment and turn-off time of auxiliary switch Sa in the corresponding switching period.

Figure 8:
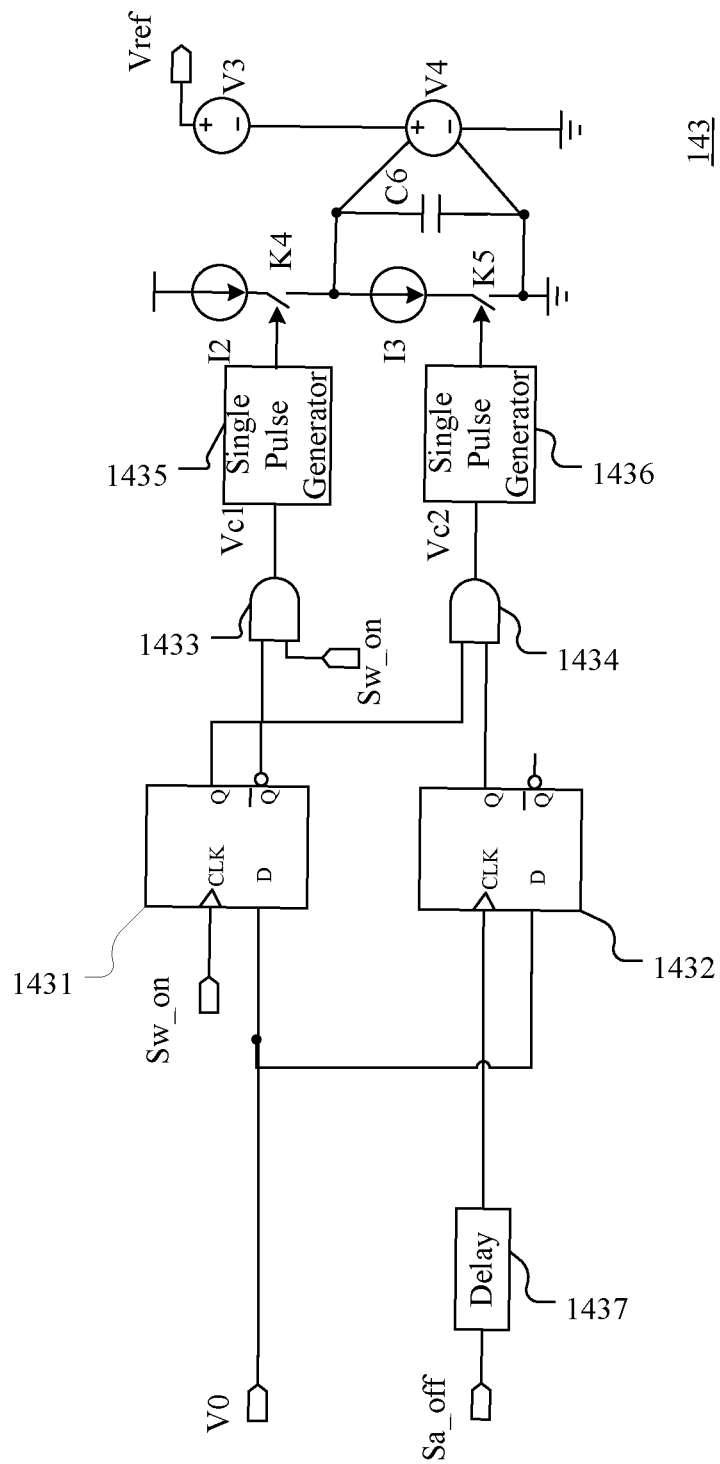
FIG. 8 is a schematic circuit diagram of an example reference voltage regulation circuit of the flyback converter, in accordance with embodiments of the present invention.

Referring now to FIG. 8, shown is a schematic diagram of an example reference voltage regulation circuit of the flyback converter, in accordance with embodiments of the present invention. In this particular example, reference voltage regulation circuit 143 can include logic circuits 1431 and 1432. Logic circuit 1431 can generate a first trigger signal according to detection signal V0 and turn-on signal Sw-on. Logic circuit 1432 can generate a second trigger signal according to detection signal V0 and a delayed signal of turn-off signal Sa-off. For example, logic circuits 1431 and 1432 can be implemented by D flip-flop circuits. In this particular example, reference voltage regulation circuit 143 can also include drive circuits 1433 and 1434. Drive circuit 1433 can generate drive signal Vc1 according to the first trigger signal and turn-on signal Sw-on. Drive circuit 1434 can generate drive signal Vc2 according to the first and second trigger signals. For example, drive circuits 1433 and 1434 can be realized by AND circuits.

Reference voltage regulation circuit 143 can include a regulation circuit including current source 12, switch K4, current source 13, switch K5, capacitor C6, voltage source V3, and voltage source V4. In this example, current source 12, switch K4, current source 13, and switch K5 can be coupled in series between the voltage source and the ground. Capacitor C6 can be coupled in parallel with current source 13 and switch K5. Voltage source V3 and voltage source V4 can be coupled in series between reference voltage signal Vref and ground. Also, a first control terminal of voltage source V4 can be coupled to a first terminal of capacitor C6, and a second control terminal of voltage source V4 may be coupled to a second terminal of capacitor C6. The regulation circuit can also include single pulse generator 1435 for generating a control signal for controlling the switching state of switch K4 according to drive signal Vc1, and single pulse generator 1436 for generating a control signal for controlling the switching state of switch K5 according to drive signal Vc2.

In this example, when the delayed signal of turn-off signal Sa-off is active, if detection signal V0 is active at the rising edge of turn-on signal Sw-on (e.g., detection signal V0 is at a high level), drive signal Vc2 may be active. Further, if detection signal V0 is inactive at the rising edge of turn-on signal Sw-on (e.g., detection signal V0 is at a low level), drive signal Vc1 can be active. When drive signal Vc1 is active, switch K4 may be turned on for a predetermined time. Then, current source 12 can positively charge capacitor C6, such that the voltage across capacitor C6 can rise, thereby increasing reference voltage signal Vref. When drive signal Vc2 is active, switch K5 can be turned on for a predetermined time. Then, current source 13 can reversely charge capacitor C6; that is, capacitor C6 can be discharged, such that the voltage across capacitor C6 may be reduced, thereby decreasing reference voltage signal Vref.

Figure 9:
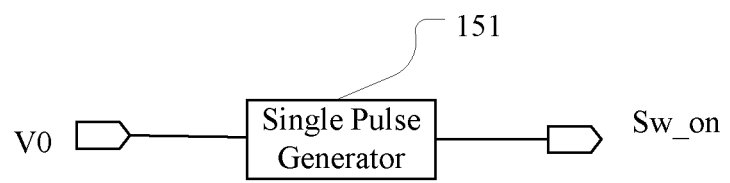
FIG. 9 is a schematic circuit diagram of an example main switch control circuit of the control circuit, in accordance with embodiments of the present invention.

Referring now to FIG. 9, shown is a schematic diagram of an example main switch control circuit of the control circuit, in accordance with embodiments of the present invention. In this example, the main switch control circuit can control the switching state of main switch Sw, and can include single pulse generator 151. Single pulse generator 151 can generate turn-on signal Sw-on to control main switch Sw to be turned on according to detection signal V0. In this example, turn-on signal Sw-on may be a pulse signal with a predetermined time width. In this particular example, the conduction time of auxiliary switch Sa may not be fixed. The control circuit can obtain a sampling voltage that characterizes the drain-source voltage of main switch Sw by sampling the voltage of the auxiliary winding, and can generate a control signal for controlling auxiliary switch Sa and a control signal for controlling main switch Sw according to the sampling voltage, such that the conduction time and the turn-on moment of auxiliary switch Sa and the turn-on moment of main switch Sw can be adjusted.

Alternatively, the control circuit can directly sample the voltage of the drain of main switch Sw to obtain a sampling voltage representing the drain-source voltage of main switch Sw, and generate a control signal for controlling auxiliary switch Sa and a control signal for controlling main switch Sw according to the sampling voltage, such that the conduction time and the turn-on moment of auxiliary switch Sa and the turn-on moment of main switch Sw can be adjusted. An additional absorption circuit may be formed by the clamp circuit, thereby suppressing the spike voltage. In addition, by controlling the turn-on moment of auxiliary switch Sa and main switch Sw, auxiliary switch Sa and main switch Sw can realize zero-voltage switching, thereby improving the efficiency, reducing the loss, and facilitating the integration of auxiliary switch Sa in the chip, and high frequency operation of the system.

For example, the control circuit can compare the sampling voltage characterizing the drain-source voltage of main switch Sw when main switch Sw is turned on against the threshold voltage. For example, when the sampling voltage is not less than the threshold voltage, the control circuit can reduce the conduction time of auxiliary switch Sa. When the sampling voltage is less than a threshold voltage when main switch Sw is turned on, the control circuit can increase the conduction time of auxiliary switch Sa. The conduction time of auxiliary switch Sa may be set according to the sampling voltage of main switch Sw, thereby further improving the effect of suppressing the spike voltage.

In another example, the control circuit can directly sample the drain-source voltage of main switch Sw to generate the sampling voltage and compare the sampling voltage to a threshold voltage when main switch Sw is turned on. For example, when the sampling voltage is not less than the threshold voltage when main switch Sw is turned on, the control circuit can increase the conduction time of auxiliary switch Sa; and when the sampling voltage is less than the threshold voltage when main switch Sw is turned on, the control circuit can reduce the conduction time of auxiliary switch Sa.

Figure 10:
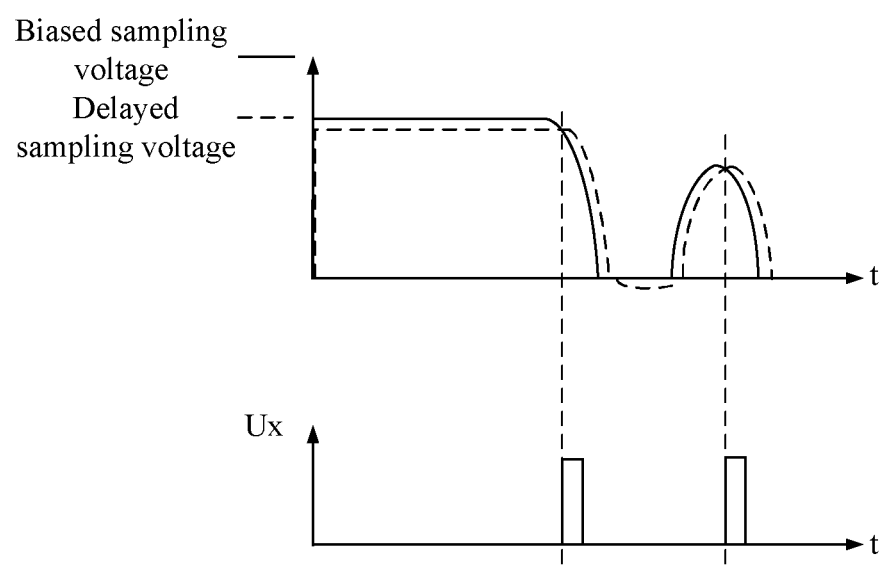
FIG. 10 is a schematic diagram of example wave-peak detection, in accordance with embodiments of the present invention.

Referring now to FIG. 10, shown is a schematic diagram of wave-peak detection, in accordance with embodiments of the present invention. The biased sampling voltage can be generated by superimposing a bias voltage on voltage Vs generated by sampling the voltage of the auxiliary winding, and the delayed sampling voltage can be generated by delaying voltage Vs through the RC delay circuit. By comparing the biased sampling voltage against the delayed sampling voltage, wave-peak detection signal Ux can be generated when the biased sampling voltage is less than the delayed sampling voltage.

Figure 11:
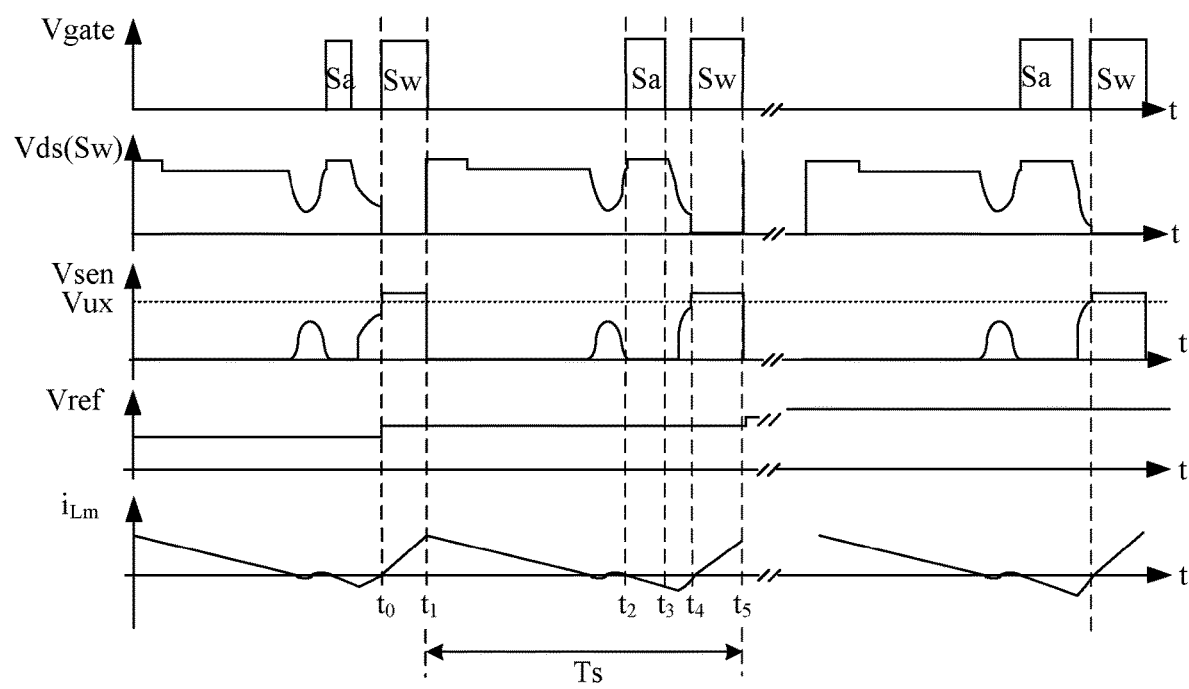
FIG. 11 is a waveform diagram of first example operation of an example control circuit, in accordance with embodiments of the present invention.
Figure 12:
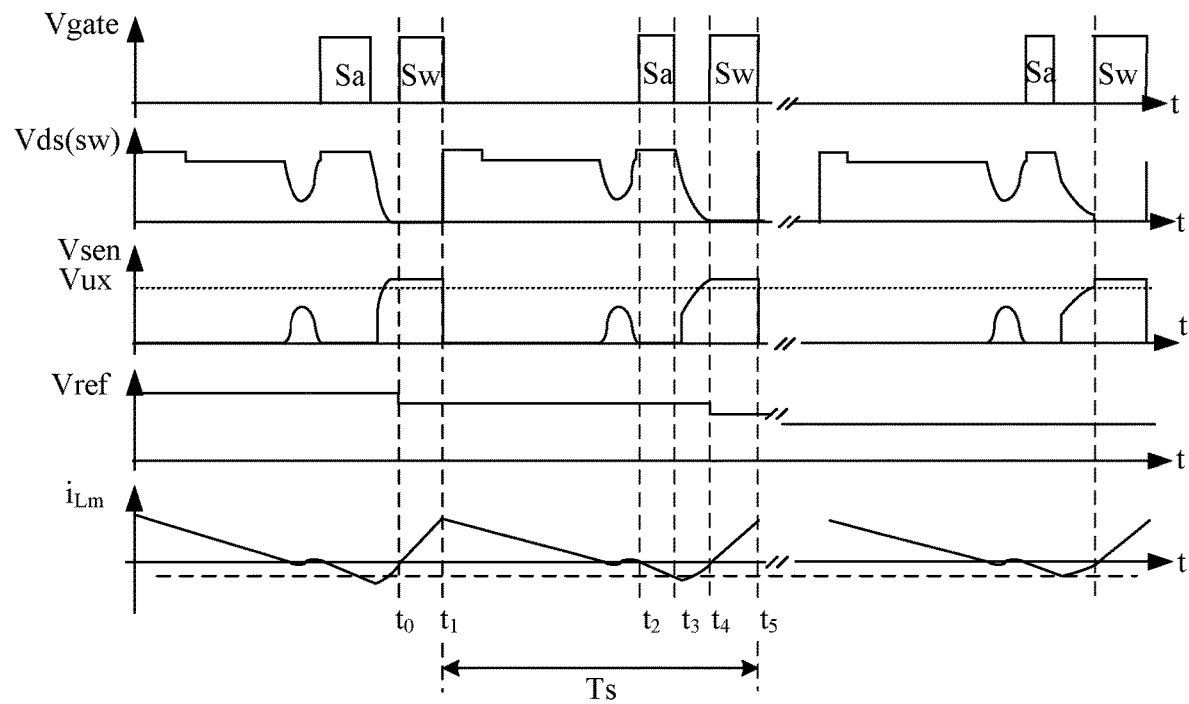
FIG. 12 is a waveform diagram of second example operation of an example control circuit, in accordance with embodiments of the present invention.

Referring now to FIGS. 11 and 12, shown are waveform diagrams of first and second example operations of an example control circuit in accordance with embodiments of the present invention. In each switching period Ts, main switch Sw and auxiliary switch Sa may alternately be turned on and off. However, main switch Sw and auxiliary switch Sa may not operate in a complementary manner, and auxiliary switch Sa may only be turned on for a part of the turn-off period of main switch Sw. The conduction time of auxiliary switch Sa can be correlated to the comparison result of sampling voltage Vsen which characterizes the drain-source voltage of main switch Sw and threshold voltage Vux. Sampling voltage Vsen may be obtained by sampling the voltage of the auxiliary winding by the detection circuit.

At time t1, main switch Sw can be switched from the on state to the off state, and auxiliary switch Sa maintains in the off state. During the turn-off period of main switch Sw, the inductor current flowing through main switch Sw can continue to decrease, and diode D1 may be forward biased and turned on. Since DC output voltage Vout is coupled to the primary winding via transformer T, drain-source voltage Vds(sw) of main switch Sw can gradually increase with respect to DC input voltage Vin. Transformer T of the flyback converter can release energy to supply power to the output capacitor and load. At time t2, auxiliary switch Sa can be switched from the off state to the on state, and main switch Sw can be maintained in the off state. The clamp circuit can also begin operation.

During the turn-on period of auxiliary switch Sa, the energy stored in leakage inductance Lk of transformer T can be released into clamp capacitor Cc through the body diode of auxiliary switch Sa. The absorption current flowing through auxiliary switch Sa may be opposite in direction to the primary current, and can gradually increase with time. Since DC output voltage Vout is coupled to the primary winding via transformer T, drain-source voltage Vds(sw) of main switch Sw may rise with respect to DC input voltage Vin. At time t3, auxiliary switch Sa can be turned off, such that the energy stored in leakage inductance Lk of transformer T and the energy stored in magnetizing inductance Lm can discharge equivalent parasitic capacitor Cds between the drain and source of main switch Sw. When auxiliary switch Sa is turned off, the magnetizing inductance current flowing through magnetizing inductance Lm can be reversely increased, and the resonance of magnetizing inductance Lm and equivalent parasitic capacitance Cds of main switch Sw may increase. Thus drain-source voltage Vds(sw) of main switch Sw can be decreased, such that zero-voltage switching of main switch Sw can be realized; that is, soft-switching of main switch Sw can be realized.

At time t4, main switch Sw can be turned on. During the turn-on period of main switch Sw, the energy may be re-stored in transformer T of the flyback converter. In this example, the period between time t3 and time t4 is the "dead zone" time inserted after auxiliary switch Sa is turned off and before main switch Sw is turned on, thereby ensuring auxiliary switch Sa and main switch Sw cannot be turned on at the same time. At time t5, main switch Sw can be switched from the on state to the off state, and auxiliary switch Sa may be maintained in the off state, and switching period Ts ends.

In the first example operation, the change of the conduction time of auxiliary switch Sa can be shown in FIG. 11 when sampling voltage Vsen at the time when main switch Sw is turned on is less than threshold voltage Vux. In the second example operation, the change of the conduction time of auxiliary switch Sa can be shown in FIG. 12 when sampling voltage Vsen at the time when main switch Sw is turned on is not less than threshold voltage Vux. The conduction time of auxiliary switch Sa and main switch Sw are the first time period from time t2 to time t3, and the second time period from time t4 to time t5, respectively.

As shown in FIG. 11, at time t0, main switch Sw can be switched from the off state to the on state. At this time, sampling voltage Vsen is less than threshold voltage Vux.

During the time period between time t0 and time t1, reference voltage signal Vref can increase by one step. During the period between time t2 and time t3, the conduction time of auxiliary switch Sa can increase compared with the conduction time of auxiliary switch Sa in the previous switching period. During the period between time t3 and time t4, magnetizing inductance current $i_{Lm}$ flowing through magnetizing inductance Lm can be reversely increased (shown as negative current transitions between time t3 and time t4), and drain-source voltage Vds(sw) before main switch Sw is turned on can decrease. After a number of switching periods of regulation, sampling voltage Vsen is equal to threshold voltage Vux at the rising edge of turn-on signal Sw-on, such that main switch Sw can achieve zero-voltage switching.

Similarly, as shown in FIG. 12, at time t0, main switch Sw can be switched from the off state to the on state. At this time, sampling voltage Vsen is not less than threshold voltage Vux. During the period from time t0 to time t1, reference voltage signal Vref can decrease by one step. During the period between time t2 and t3, the conduction time of auxiliary switch Sa is decreased can be compared against the conduction time of auxiliary switch Sa in the previous switching period. During the period between time t3 and time t4, current $i_{Lm}$ can be reversely decreased, such that drain-source voltage Vds(sw) before main switch Sw is turned on can increase. After a number of switching periods of regulation, sampling voltage Vsen may be equal to threshold voltage Vux at the rising edge of turn-on signal Sw-on, such that main switch Sw can achieve zero-voltage switching.

Figure 13:
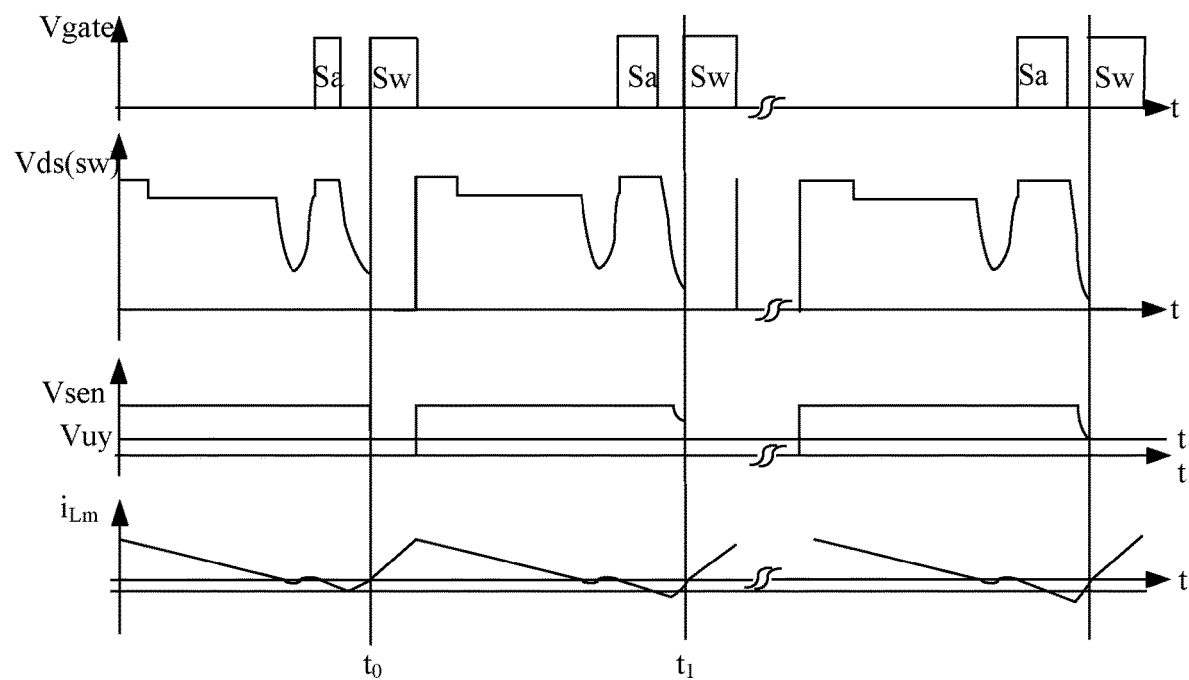
FIG. 13 is a waveform diagram of example operation of another example control circuit, in accordance with embodiments of the present invention.

Referring now to FIG. 13, shown is a waveform diagram of example operation of another example control circuit, in accordance with embodiments of the present invention. If main switch Sw is turned on, the detection circuit can obtain sampling voltage Vsen by directly sampling the drain-source voltage of main switch Sw. When sampling voltage Vsen is not less than threshold voltage Vuy when main switch Sw is turned on (e.g., at time t0), the conduction time of auxiliary switch Sa can increase in the next switching period, thereby reversely increasing magnetizing inductance current $i_{Lm}$ flowing through magnetizing inductance Lm. Thus, sampling voltage Vsen may be closer to threshold voltage Vuy when main switch Sw is turned on in the next switching period. After several switching periods, sampling voltage Vsen may be equal to threshold voltage Vuy, such that main switch Sw can realize zero-voltage switching. Similarly, when sampling voltage is Vsen is less than threshold voltage Vuy at the rising edge of turn-on signal Sw-on, the conduction time of auxiliary switch Sa can be reduced in the next switching period, thereby reversely decreasing current $i_{Lm}$ flowing through magnetizing inductance Lm. Thus, sampling voltage Vsen can be closer to threshold voltage in the next switching period when main switch Sw is turned on. After several switching periods, main switch Sw can achieve zero-voltage switching.

Figure 14:
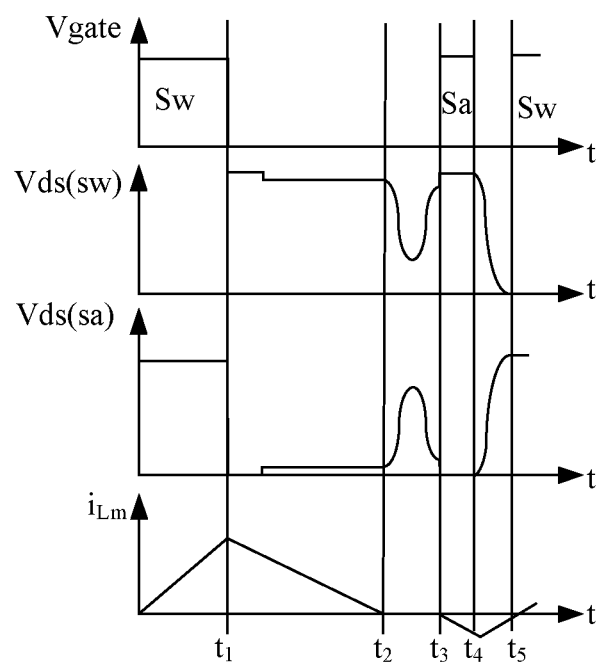
FIG. 14 is a waveform diagram of example operation for controlling the auxiliary switch, in accordance with embodiments of the present invention.

Referring now to FIG. 14, shown is a waveform diagram of example operation for controlling auxiliary switch Sa, in accordance with embodiments of the present invention. At time t3, when drain-source voltage Vds(sw) of main switch Sw rises to the wave-peak, drain-source voltage Vds(sa) of auxiliary switch Sa can just be reduced to the wave-valley due to the resonance. If auxiliary switch Sa is turned on at this time, the turn-on loss of auxiliary switch Sa can be reduced.

In particular embodiments, the control circuit can adjust the conduction time of the auxiliary switch according to the drain-source voltage of the main switch when the main switch is turned on, and can adjust the reverse direction magnetizing inductance current flowing through the magnetizing inductance, such that the drain-source voltage of the main switch can be reduced in the next switching period, thereby finally realizing the zero-voltage switching of the main switch. In certain embodiments, when the drain-source voltage of the main switch reaches to the wave-peak due to resonance, the auxiliary switch may be turned on. At this time, the drain-source voltage of the auxiliary switch can just reach the wave-valley due to resonance, which can reduce the turn-on loss of the auxiliary switch, thereby further improving the effect of suppressing the spike voltage.

The flyback converter can use the control circuit as described herein to not only reduce standby power consumption, but also maintain high efficiency at a high switching frequency and improve ultra-light load efficiency, thereby increasing power density. In addition, the control circuit can facilitate integration for chip control and reduce chip pins and peripheral devices.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:
1. A control circuit for a flyback converter having an auxiliary switch and a main switch, the control circuit comprising:
 a) a detection circuit configured to generate a sampling voltage representing the drain-source voltage of the main switch, and to compare the sampling voltage against a threshold voltage when the main switch is turned on, in order to generate a detection signal; and
 b) an auxiliary switch control circuit comprising a reference voltage regulation circuit configured to adjust a reference voltage signal in accordance with the detection signal when the main switch is turned on, wherein a conduction time of the auxiliary switch is adjusted in order to achieve zero-voltage switching of the main switch.

2. The control circuit of claim 1, wherein the conduction time of the auxiliary switch is adjusted in accordance with the drain-source voltage of the main switch at a moment when a state of the main switch is converted from an off state to an on state.

3. The control circuit of claim 1, wherein the control circuit is configured to adjust a turn-on moment of the auxiliary switch in accordance with the drain-source voltage of the main switch to reduce turn-on loss of the auxiliary switch.

4. The control circuit of claim 1, wherein the control circuit is configured to control the auxiliary switch to be turned on at a wave-peak moment of the drain-source voltage of the main switch.

5. The control circuit of claim 1, wherein the control circuit is configured to control the auxiliary switch to be turned on for a first period before the main switch is turned on during each switching period, and to control the main switch to be turned on for a second period, wherein the first and second periods are not overlapped in the switching period.

6. The control circuit of claim 1, wherein the control circuit comprises a main switch control circuit configured to generate a turn-on signal of the main switch to control a turn-on moment of the main switch in accordance with the detection signal.

7. The control circuit of claim 1, wherein the detection circuit is configured to generate the sampling voltage by sampling a voltage across an auxiliary winding coupled to a secondary winding of a transformer in the flyback converter, such that the sampling voltage characterizes the drain-source voltage of the main switch.

8. The control circuit of claim 7, wherein the detection circuit comprises: a first conversion circuit, configured to obtain the sampling voltage by remaining a positive voltage part of a first voltage sampled by the voltage of the auxiliary winding, and making a negative voltage part of the first voltage to be zero.

9. The control circuit of claim 7, wherein the detection circuit comprises a sample-and-hold circuit configured to generate the threshold voltage in accordance with the sampling voltage.

10. The control circuit of claim 1, wherein the detection circuit is configured to generate the sampling voltage by sampling a drain voltage of the main switch and the sampling voltage characterizes a low voltage part of the drain-source voltage of the main switch.

11. The control circuit of claim 10, wherein the threshold voltage is a predetermined value.

12. The control circuit of claim 1, further comprising a wave-peak detection circuit configured to sample a voltage across an auxiliary winding coupled to a secondary winding of a transformer to generate a first voltage characterizing the drain-source voltage of the main switch, and to generate a wave-peak detection signal in accordance with the first voltage.

13. The control circuit of claim 1, wherein the auxiliary switch control circuit is configured to control a second voltage to increase to the reference voltage signal after the auxiliary switch is turned on, in order to control the auxiliary switch to be turned off.

14. A flyback converter, comprising the control circuit of claim 1, and further comprising:
 a) a main power stage having the main switch to control energy storage and transmission of a transformer; and
 b) a clamp circuit having an auxiliary switch to provide a release path for releasing energy of leakage inductance of the transformer.

15. The flyback converter of claim 14, wherein the clamp circuit comprises the auxiliary switch and a clamp capacitor, and the clamp circuit is coupled in parallel with a primary winding of the transformer.

16. The flyback converter of claim 14, wherein the clamp circuit comprises the auxiliary switch and a clamp capacitor, and the clamp circuit is coupled in parallel with the main switch.

17. The control circuit of claim 1, wherein:
 a) when the detection signal is active, the conduction time of the auxiliary switch is controlled to decrease by the auxiliary switch control circuit; and
 b) when the detection signal is inactive, the conduction time of the auxiliary switch is controlled to increase by auxiliary switch control circuit.

18. A control circuit for a flyback converter, wherein the control circuit is configured to adjust a conduction time of an auxiliary switch of the flyback converter in accordance with a drain-source voltage of a main switch of the flyback converter when the main switch is turned on, in order to achieve zero-voltage switching of the main switch, wherein the control circuit comprises:
 a) a wave-peak detection circuit configured to sample a voltage across an auxiliary winding coupled to a secondary winding of a transformer to generate a first voltage characterizing the drain-source voltage of the main switch, and to generate a wave-peak detection signal in accordance with the first voltage; and
 b) wherein the wave-peak detection circuit comprises a bias voltage configured to be superimposed on the first voltage to generate a biased sampling voltage, a delay circuit configured to delay the first voltage to generate a delayed sampling voltage, and a comparator configured to compare the biased sampling voltage against the delayed sampling to generate the wave-peak detection signal.

19. The control circuit of claim 12, wherein the auxiliary switch control circuit is configured to control the auxiliary switch to be turned on in accordance with the wave-peak detection signal and a frequency limit signal.

* * * * *